United States Patent Office 3,475,436
Patented Oct. 28, 1969

3,475,436
PROCESS FOR OXIDIZING DIHYDROQUIN-
ACRIDONES TO QUINACRIDONES
Joseph H. Cooper, Hillside, and Oscar J. C. Klein, Westfield, N.J., assignors to E. I. du Pont de Nemours and Company, Wilmington, Del., a corporation of Delaware
No Drawing. Filed Oct. 19, 1965, Ser. No. 498,100
Int. Cl. C09b 15/00; C07d 37/00
U.S. Cl. 260—279                    2 Claims

ABSTRACT OF THE DISCLOSURE

A process is disclosed for the oxidation of dihydroquinacridones to their corresponding quinacridones with air in a midium of an alkali, water, and tetramethylene sulfone at an elevated temperature using less than the stoichiometric quantity of a polycyclic aromatic quinone compound. Pigment recovery is accomplished by subsequently diluting the mixture with water. Quinacridones are useful as pigments.

---

This invention relates to an improved process for the manufacture of quinacridones and more particularly to an improved process for oxidizing dihydroquinacridones to quinacridones with or without subsequent control of the crystal phase in the final quinacridone.

The oxidation of a dihydroquinacridone to the corresponding quinacridone was first disclosed in U.S. Patent 2,821,529. The oxidation was done in aqueous alcoholic alkali solutions with certain mild oxidizing agents. While the preferred oxidizing agent is stated to be the sodium salt of nitrobenzene-m-sulfonic acid, air or oxygen is stated to function. Attempts to use air as an oxidizing agent in the oxidation of dihydroquinacridone to quinacridone in a medium of water, tetramethylene sulfone and potassium hydroxide, however, have invariably resulted in the undesirable formation of a mixture of quinacridone and quinacridonequinone.

More recently there has been a series of patents showing that quinone derivatives can also function as oxidizing agents in this reaction as well as in oxidizing a dialkyl diarylaminodihydroterephthalate as one step in a route to quinacridones.

Such art fails to show tetramethylene sulfone and the other solvents of this invention as useful nor does it give any hint as to phase control of the resulting quinacridones.

It is an object of this invention to provide an improved method of oxidation of a dihydroquinacridone to the corresponding quinacridone. A still further object of the invention is to provide an integrated process wherein the oxidation of dihydroquinacridone can be accomplished without the dihydroquinacridone being isolated from its solvent of synthesis and wherein the oxidation step may be followed with an improved means of phase control in the regeneration of the quinacridone from its dispersion and partial solution in the mixture resulting from the oxidation step.

These objects are accomplished by the oxidation of a dihydroquinacridone to the corresponding quinacridone in a medium consisting essentially of a mixture of an alkali, water and tetramethylene sulfone at an elevated temperature using less than the stoichiometric quantity of a polycyclic aromatic quinone compound (anthraquinone, naphthoquinone, phenanthraquinone) as the oxidant and concurrently regenerating the quinone compound by blowing a gas containing elemental oxygen through the reaction mixture and subsequently diluting the mixture with water and recovering the pigment therefrom.

In a specific embodiment of the invention, 6,13-dihydroquinacridone is oxidized to linear quinacridone as described above and the step of dilution with water is controlled to give a product selected from the group consisting of:

(1) Beta phase linear quinacridone which is obtained by rapidly adding the oxidation mixture to a large volume of water below 10° C. and, (2) Gamma phase quinacridone which is obtained by slowly adding hot water to the hot oxidation mixture maintained near the boiling point.

In a modification of the invention, 100 parts of linear quinacridone is dispersed and partially dissolved as the alkali metal salt in a mixture of 55 parts of water, 350 parts of tetramethylene sulfone and 45 parts of an alkali metal hydroxide at an elevated temperature and the mixture is diluted with water to regenerate the quinacridone in either the beta or gamma phase as described above. The pigment is then recovered from the mixture by conventional means.

In a preferred embodiment of this invention, a slurry of 22 parts dihydroquinacridone in about 78 parts tetramethylene sulfone (such as might be obtained by cyclizing diethyl 2,5 - dianilino - 3,6 - dihydroterephthalate in boiling tetramethylene sulfone and then cooling—see Example I of U.S. Patent 3,007,930) is treated with an aqueous solution of 10 parts KOH in 12 parts water to which is then added a small amount (0.22 part) of 2-chloroanthraquinne. The mixture is heated at 110° C. and blown with air until all the dihydroquinacridone is oxidized. The pigment is regenerated from the mixture by dilution with water and isolated by filtering, washing and drying in a conventional manner.

Where it is desired to obtain the quinacridone in solely the beta or gamma phase, this is accomplished by controlling the regeneration step by either of the following procedures:

(1) The hot oxidation mixture is added as rapidly as possible to a large volume of ice and water to regenerate the pigment in the beta crystal phase (see U.S. Patent 2,844,485).

(2) Hot water (about 2 volumes) is added very slowly (½ to 1 hour) to the hot oxidation mixture maintained near the boiling point to slowly precipitate the quinacridone in the gamma crystal phase (see U.S. Patent 2,844,-581).

The following specific examples are presented to give a clearer understanding of the invention. These examples are intended to be merely illustrative of the invention and not in limitation thereof. Unless otherwise specified, all parts are by weight.

EXAMPLE I

The following ingredients are charged into a vessel of suitable size, equipped with an agitator, with a means for measuring temperature, with a reflux condenser and with a suitable diffuser (such as a fritted glass disc for admitting a gas below the liquid level:

|  | Parts |
|---|---|
| Dihydroquinacridone (DQA) | 72 |
| Tetramethylene Sulfone (TMS) | 252 |
| Potassium hydroxide | 32 |
| Water | 40 |

The charge is heated to the boil (135° C.), boiled under reflux for ½ hour and cooled to 110° C. 0.72 part of 2-chloroanthraquinone is then added and the charge is blown with air at a maximum rate permitted by the tendency to foam (about 2 times the liquid volume per minute) for about ½ hour. The rate of air blowing is then reduced to about ⅓ the initial rate and maintained at the lower rate until the dihydroquinacridone is completely oxidized as evidenced by the following test:

Test for completion of oxidation

A drop of the reaction slurry is placed on a piece of non-fluorescsent unsized black paper. The drop is diluted with about an equal volume of water and well stirred. It is then dried rapidly with heat and observed under an ultraviolet light in the absence of visible light. Visible fluorescence denotes the presence of unreacted dihydroquinacridone.

When dihydroquinacridone is no longer present, the introduction of air is stopped and the charge is added to about 4 volumes of water, stirred for 2 to 3 hours, filtered, washed and dried to give a quantitative yield of quinacridone, a red pigment, usually in a mixture of beta phase and gamma phase quinacridone.

EXAMPLE II

A slurry of dihydroquinacridone is oxidized in a solution of tetramethylene sulfone, potassium hydroxide and water at the boil, using a small amount of 2-chloroanthraquinone and blowing with air as described in detail in Example I until oxidation is complete as determined by the test described. While keeping the mixture near the boil under reflux, hot water is added dropwise until the volume is approximately three times the original. The quinacridone is precipitated as a red pigment which is isolated in quantitative yield by conventional means. When examined by X-ray diffraction, the pigment has the diffraction pattern typical of the gamma crystal phase (see U.S. Patent 2,844,581).

EXAMPLE III

Dihydroquinacridone is oxidized as described in Examples I and II until oxidation is complete as shown by the test described. The temperature is adjusted to about 120° C. and the charge is poured rapidly (about 30 seconds) into a vigorously agitated mixture of 900 parts ice and 270 parts of 50% potassium hydroxide. A violet colored precipitate separates at once. As stirring is continued for about 3 hours the color changes from violet to deep red. The precipitate is filtered, washed free of alkali and dried to give a quantitative yield of beta phase quinacridone (see U.S. Patent 2,844,485).

EXAMPLE IV

In the process of Example I, 78.4 parts of 2,9-dimethyl-6,13-dihydroquinacridone is used instead of unsubstituted quinacridone together with:

| | Parts |
|---|---|
| Tetramethylene sulfone | 252 |
| Potassium hydroxide | 32 |
| Water | 40 |

After heating for ½ hour at the boil and cooling to 110° C., 0.78 part of 2-chloroanthraquinone is added and the charge blown at the maximum rate to avoid foaming (about 2 times the liquid volume per minute) for 105 minutes and then at about ⅓ this rate for a further 15 minutes until the spot test no longer shows fluorescence. The temperature of the charge is adjusted to about 120° C. and it is poured rapidly (about 30 seconds) into a vigorously agitated mixture of 900 parts ice and 270 parts 50% aqueous KOH. After stirring for 2 to 3 hours, the dark red product is isolated in quantitative yield and identified by its X-ray diffraction pattern as 2,9-dimethylquinacridone, a magenta colored pigment.

EXAMPLE V

Using the equipment described in Example I

| | Parts |
|---|---|
| 2,9-dimethoxy-6,13-dihydroquinacridone | 21.4 |
| Tetramethylene sulfone | 252 |
| Potassium hydroxide | 32 |
| Water | 40 | are heated for ½ hour at the boil and cooled to about 110° C. 0.22 part of 2-chloroanthraquinone is added and the charge blown with air at the highest possible rate for 20 minutes and then at about ⅓ the rate for 1 hour until no fluorescence persists in the spot test. The hot charge is poured rapidly into 2000 parts of cold water with agitation which is continued for 1 hour. The pigment is isolated by filtering, washing free of alkali and drying to give a quantitative yield of 2,9-dimethoxyquinacridone a violet pigment.

EXAMPLE VI

Using the equipment described in Example I, the following ingredients are charged to the reactor:

| | Parts |
|---|---|
| Dihydroquinacridone | 43.2 |
| 2,9-dimethyldihydroquinacridone | 31.4 |
| Tetramethylene sulfone | 252 |
| Potassium hydroxide | 32 |
| Water | 40 |

After heating at the boil for about ½ hour and cooling to 110° C., 0.75 part of 2-chloroanthraquinone is added and the charge blown with air as shown in Example I until the spot test shows no free dihydroquinacridone. It is then poured rapidly into 1000 parts of vigorously agitate water and agitation is continued for 1 hour or more. The pigment is isolated by filtering, washing alkali free and drying to give a quantitative yield of a bluish red shade quinacridone pigment which exhibits the characteristic X-ray diffraction pattern of a solid solution of quinacridone and 2,9-dimethylquinacridone (see U.S. Patent 3,160,510).

EXAMPLE VII 94 parts of diethyl 2,5-dianilino-3,6-dihydroterephthalate and 375 parts of tetramethylene sulfone are charged to a suitable vessel similar to that of Example I. The atmosphere is displaced with nitrogen and the charge heated for 1 hour at about 250° C. It is then cooled to 100° C., whereupon 44 parts of potassium hydroxide and 55 parts of water are added, air is admitted and the charge reheated to about 135° C. for about ½ hour. It is then cooled to 110° C. and 0.72 part 2-chloroanthraquinone added, after which it is blown with air rapidly at first and then more slowly, as shown in Example I, until the dihydroquinacridone is completely oxidized. The charge is then added rapidly to a large volume of agitated ice and water maintained below 5° C. and vigorous agitation is continued for at least 1 hour. The charge is then filtered, washed free of alkali and dried to give a quantitative yield of beta phase quinacridone.

EXAMPLE VIII

Phase control alone 30 parts of crude quinacridone (such as made by the process of U.S. Patent 2,821,529) is dispersed in 100 parts tetramethylene sulfone to which is added 13 parts of potassium hydroxide and 16 parts water and the mixture heated for about 1 hour at 110° C. The pigment may be regenerated in either of two ways:

(a) The hot slurry is poured rapidly (about ½ minute) into a mixture of 600 parts ice in 400 parts water under vigorous agitation. The stirring is continued for at least 1 hour and the pigment isolated by filtering, washing alkali free and drying to a bluish red shade quinacridone in a substantially pure beta phase.

(b) The slurry is maintained near the boil under reflux and 200 parts water at 70° C. or above is added dropwise over a 15 to 30 minute period. The quinacridone precipitates as a red pigment which is isolated by filtering, washing free of alkali, and drying. When examined by X-ray diffraction, this pigment exhibits the diffraction pattern typical of the gamma crystal phase (see U.S. Patent 2,844,581).

The examples have shown the use of tetramethylene sulfone (sulfolane) as the preferred solvent for the purposes of this invention. This is especially valuable because it boils at a sufficiently high point to be useful as a heat transfer agent and solvent for the cyclization step in the synthesis of dihydroquinacridones as in U.S. Patent 2,821,529. This is typified in Example VII where the oxidation is conducted without isolation of the dihydoquinacridone. However, for the oxidation step alone, certain other solvents have been shown to be effective. These include N-methylpyrrolidone, dimethyl sulfoxide and the monobutyl ether of diethylene glycol. All these named solvents are effective for the phase control steps as applied to unsubstituted quinacridones. Of those named as useful, tetramethylene sulfone is definitely the agent of choice.

The addition of the small amount of 2-chloroanthraquinone as shown in the example during the blowing with air of a slurry of a dihydroquinacridone in a mixture of tetramethylene sulfone, water and a strong alkali has a profound effect on the course of the oxidation. It can be shown that, in the absence of a quinone derivative, such an oxidation with air is slow and always results in a mixture of a quinacridone and a quinacridonequinone. When the quinone derivative is present, however, the oxidation is quite rapid and goes cleanly to the pure quinacridone until all of the dihydroquinacridone is consumed. Although we do not wish to be bound by such a theory, the evidence supports the conclusion that the dihydroquinacridone is oxidized to a quinacridone by the quinone derivative to form a leuco compound thereof which in turn is rapidly converted to the original quinone by blowing with air. Thus, any quinone derivative which forms a stable and readily reoxidizable leuco compound in the alkaline medium employed should be effective. In addition to 2-chloroanthraquinone, other useful quinones include anthraquinone, dihydroxyanthraquinone, trihydroxyanthraquinone, 1,4 - naphthoquinone, dichloronaphthoquinone, anthraquinone carboxylic acid, anthraquinone sulfonic acid and phenanthraquinone. These useful agents are all polycyclic quinones. In contrast, the monocyclic quinones such as benzoquinone and chloranil appear to be decomposed under the conditions required for oxidation and the course of oxidation in their presence does not seem to be influenced by their presence.

The amount of KOH used seems to be somewhat critical. The examples have shown an amount (2.5 mols of KOH) which is approximately 25% more than is required to form the dipotassium salt of dihydroquinacridone. This amount can be reduced to 2.05 mols of KOH per mol of dihydroquinacridone with some increase in oxidation time, but reduction significantly below 2 mols KOH gives an inoperable mixture. Some increase beyond 2.5 mols KOH is permissible, say to about 3.0 mols, but does not offer any significant advantage.

The nature of the alkali can be varied. Sodium hydroxide can be used on an equimolar basis in place of potassium hydroxide with some increase in oxidation time and difficulty in controlling crystal phase on regeneration of the quinacridone. A strong organic alkaline agent such as benzyltrimethyl ammonium hydroxide is also useful through less desirable than the inorganic alkalies.

It is preferred that the amount of water in the mixture be approximately equal to the weight of the KOH used. Thus, it is convenient to use a 50% solution of KOH as the source of both the KOH and the water. In practical use, it is permissible for the water to be somewhat in excess of this amount, say up to 125% of the weight of the KOH. However, the amount of water may vary somewhat in either direction from the preferred range. On the lower side, it may be reduced to 50% of the weight of the KOH and, at the other extreme one may use up to about 2 times the weight of the KOH. Beyond the extremes, there is marked reduction in the solubility of the dihydroquinacridone in the mixture with a consequent major influence on the rate of oxidation.

The concentration of dihydroquinacridone in the reaction mixture is not of major importance except that it must be substantially all in solution at the temperature of reaction. For unsubstituted dihydroquinacridone, it is convenient to use about 1 part per 4 parts of liquid (tetramethylene sulfone+water). Lower amounts may be used with complete success and are preferred for some of the less soluble substituted dihydroquinacridones. In general, the preferred usage may be found when 1 part dihydroquinacridone is used with from 4 to 15 parts total liquid.

The amount of polycyclic quinone used in the examples is, in each case, approximately 1% the weight of the dihydroquinacridone. This is not a critical amount but significant reduction below this amount results in some reduction in the rate of oxidation. Larger amounts are entirely usable but are uneconomical.

The effective use of an oxygen containing gas as an oxidant in a reaction such as described herein is influenced both by the rate at which it is introduced and by the efficiency of the dispersion. It is effective to use a gas dispersing device such as a fritted glass disc or a microporous metal disc but the nature of the device is unimportant as long as the gas bubbles are kept small. At the start of the reaction, it is customary to blow the gas into the mixture at the maximum rate which can be used without excessive foaming. The volume of gas introduced is not critical and may vary from about 2 times the liquid volume per minute to perhaps 3 times the liquid volume. After an initial rapid uptake of oxygen, the efficiency of utilization decreases and the rate of blowing is desirably reduced to the range of ⅓ to ½ the original rate. The end point of the oxidation is determined as in Example I by the disappearance of fluorescence in the manner described. The introduction of an oxygen-containing gas beyond this point is apt to result in the formation of some quinacridonequinone. Under some conditions this may be desirable but it is not considered a part of this invention. It is satisfactory and most economical to use air as the oxygen-containing gas but pure oxygen may be used on the one hand or synthetic mixtures of oxygen with inert gases, such as nitrogen, helium or the like, on the other hand. The use of pure oxygen in the presence of hot organic liquids is a source of considerable hazard, hence is not preferred.

Example VII illustrates one reason why tetramethylene sulfone is a preferred liquid. As shown in U.S. Patent 3,007,930, the cyclization of diethyl 2,5-dianilino-3,6-dihydroterephthalate to 6,13-dihydroquinacridone may be readily accomplished by heating in tetramethylene sulfone. It is not then necessary to isolate the dihydroquinacridone but the variables already established may be applied to the resultant mixture to oxidize the dihydroquinacridone in situ to the quinacridone which may be isolated by the various methods described. For this process to be effective, the liquid used must have a boiling point above about 250° C. which is necessary for the cyclization reaction.

This invention has been applied in the examples to the oxidation of unsubstituted 6,13-dihydroquinacridone and to certain substituted derivatives such as:

2,9-dimethyl-6,13-dihydroquinacridone, and
2,9-dimethoxy-6,13-dihydroquinacridone.

The invention is equally applicable to other substituted dihydroquinacridones including the following:

2,9-dichloro-6,13-dihydroquinacridone
4,11-dichloro-6,13-dihydroquinacridone
2,9-dibromo-6,13-dihydroquinacridone
4,11-dibromo-6,13-dihydroquinacridone
4,11-difluoro-6,13-dihydroquinacridone
4,11-dimethyl-6,13-dihydroquinacridone 2,4,9,11-tetramethyl-6,13-dihydroquinacridone
2,4,9,11-tetrachloro-6,13-dihydroquinacridone.

All of these are encompassed within the following generic formula:

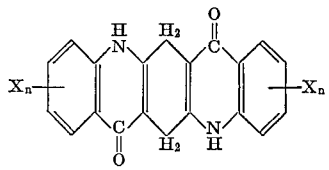

where X is halogen, lower alkyl or lower alkoxy (up to 3 carbon atoms) and $n$ is 0 to 2.

The final precipitation and recovery of the pigment from the strongly alkaline suspension in tetramethylene sulfone and water requires as an essential step that the mixture be diluted with a substantial quantity of water to hydrolyze any potassium salt of that quinacridone which may be present and to reduce the solvency of the liquid. This requires the addition of at least an equal volume of water and preferably several volumes of water. The method by which this dilution is accomplished may vary between two extremes with profound effect upon the crystal phase of the resulting product. As one extreme, the hot slurry of pigment, tetramethylene sulfone and water is poured rapidly into a large volume of water and ice. This results in very rapid dilution and cooling and the formation of a less stable crystal phase. In the case of the unsubstituted quinacridone, this is the violet colored beta phase. The principle is equally useful with substituted quinacridones which form more than one crystal phase.

At the opposite extreme, water is added slowly to the hot pigment slurry while maintaining the high temperature. It is thus possible for the growing crystals to remain in complete equilibrium with the solution phase as they form, whereupon the crystals assume their most stable phase. This is the bright red gamma phase of unsubstituted quinacridone, but the principle is equally useful with other quinacridones.

If control of crystal phase is not important such care need not be exercised in the details of dilution as long as sufficient water is used to completely precipitate the pigments.

The principal advantage of this invention lies in a means to make possible a completely integrated process for the preparation of a quinacridone compound through the various steps from the conventional raw materials of U.S. Patent 2,821,529 and U.S. Patent 2,821,541 (a dialkyl succinate and a diarylamine) through to the final product in a selected crystal phase, using the same solvent and heat transfer agent throughout. There is also a substantial economic advantage in the use of air as the source of the oxygen required to oxidize the dihydroquinacridone.

What is claimed is:

1. A process for the oxidation of a dihydroquinacridone to the corresponding quinacridone comprising heating to an elevated temperature a dihydroquinacridone with a mixture of a strong alkali, water and tetramethylene sulfone, introducing into the solution less than the stoichiometric quantity of 2-chloroanthraquinone, blowing air through the reaction mixture, subsequently diluting the reaction mixture by rapidly adding the reaction mixture to a large volume of cold water with prolonged stirring to produce a quinacridone in beta phase, and isolating said beta phase quinacridone product.

2. The process of claim 1 wherein the dihydroquinacridone is unsubstituted which results in a final product of unsubstituted linear quinacridone in the beta phase.

References Cited

UNITED STATES PATENTS

| | | | |
|---|---|---|---|
| 3,352,867 | 11/1967 | Adachi | 260—279 |
| 3,007,930 | 11/1961 | Manger | 260—279 |
| 3,024,239 | 3/1962 | Caliezi | 260—279 |
| 3,074,950 | 1/1963 | Deuschel et al. | 260—279 |
| 3,317,539 | 5/1967 | Jaffe | 260—279 |

FOREIGN PATENTS

| | | |
|---|---|---|
| 1,279,324 | 11/1961 | France. |
| 1,328,160 | 4/1963 | France. |

DONALD G. DAUS, Primary Examiner

U.S. Cl. X.R.

260—607, 687, 369, 384, 326.8, 615, 383, 396, 370, 567.6